(12) United States Patent
Braun (10) Patent No.: US 11,878,452 B2
(45) Date of Patent: Jan. 23, 2024

(54) HOT OR COLD RUNNER DEVICE FOR AN INJECTION MOLD COMPRISING AN EXCHANGEABLE DEFLECTION AND DISTRIBUTION INSERT

(71) Applicant: EWIKON HEIßKANALSYSTEME GMBH, Frankenberg (DE)

(72) Inventor: Peter Braun, Hungen (DE)

(73) Assignee: EWIKON Heißkanalsysteme GmbH, Frankenberg (DE)

( * ) Notice: Subject to any disclaimer, the term of this patent is extended or adjusted under 35 U.S.C. 154(b) by 189 days.

(21) Appl. No.: 17/440,252

(22) PCT Filed: Mar. 5, 2020

(86) PCT No.: PCT/EP2020/055839
§ 371 (c)(1),
(2) Date: Sep. 17, 2021

(87) PCT Pub. No.: WO2020/200625
PCT Pub. Date: Oct. 8, 2020

(65) Prior Publication Data
US 2022/0176603 A1 Jun. 9, 2022

(30) Foreign Application Priority Data
Mar. 19, 2019 (DE) .................... 10 2019 106 975.0

(51) Int. Cl.
*B29C 45/27* (2006.01)

(52) U.S. Cl.
CPC ...... *B29C 45/2758* (2013.01); *B29C 45/2725* (2013.01); *B29C 2045/2733* (2013.01); *B29K 2995/0094* (2013.01)

(58) Field of Classification Search
CPC ............ B29C 45/2725; B29C 45/2758; B29C 45/2733; B29C 2045/2717
See application file for complete search history.

(56) References Cited

U.S. PATENT DOCUMENTS 3,669,596 A * 6/1972 Savory ................ B29C 45/2725
425/549
3,940,224 A * 2/1976 Armour .............. B29C 45/2725
425/572
(Continued)

FOREIGN PATENT DOCUMENTS

DE 19730179 C1 10/1998
DE 19649621 B4 8/2007
(Continued)

OTHER PUBLICATIONS

International Search Report dated May 26, 2020 in related/corresponding International Application No. PCT/EP2020/055839.
(Continued)

*Primary Examiner* — Emmanuel S Luk
(74) *Attorney, Agent, or Firm* — PATENT PORTFOLIO BUILDERS PLLC (57) ABSTRACT

A hot or cold runner device for an injection mold includes a distributor block for polymer melts or polymeric liquids such as liquid silicone. The distributor block includes at least one central supply line, at least one melt channel, at least one fluid outlet, and at least one exchangeable deflection and/or distribution insert. The deflection and/or distribution insert has a sleeve and a cone element for deflecting and/or distributing the melts or liquids and is mounted without gaps and without offset at flow channel transitions by a pressing-in process, and the cone element is held in the sleeve in a self-locking manner.

18 Claims, 8 Drawing Sheets

(56) References Cited

U.S. PATENT DOCUMENTS

| | | | | |
|---|---|---|---|---|
| 4,017,242 | A * | 4/1977 | Mercer | B29C 45/2725 425/549 |
| 4,292,018 | A * | 9/1981 | Beale | B29C 45/2725 425/572 |
| 4,609,138 | A * | 9/1986 | Harrison | B23K 1/0008 425/572 |
| 4,832,254 | A * | 5/1989 | Peuke | B23P 15/007 425/572 |
| 4,932,858 | A * | 6/1990 | Gellert | B29C 45/2806 425/572 |
| 5,366,369 | A * | 11/1994 | Gellert | B29C 45/2725 425/549 |
| 5,441,197 | A * | 8/1995 | Gellert | B23K 1/008 228/49.1 |
| 5,683,731 | A * | 11/1997 | Deardurff | B29C 45/2701 425/572 |
| 5,762,976 | A * | 6/1998 | Brown | B29C 45/2725 425/572 |
| 5,955,121 | A * | 9/1999 | Gellert | B29C 45/2725 425/549 |
| 6,007,108 | A | 12/1999 | Braun | |
| 6,079,971 | A * | 6/2000 | Ramond | B29C 45/2725 425/572 |
| 6,095,790 | A * | 8/2000 | Gellert | B22D 17/2038 425/572 |
| 6,368,100 | B1 * | 4/2002 | Gunther | B29C 45/2725 425/572 |
| 6,422,856 | B1 * | 7/2002 | Mochizuki | B29C 45/2738 425/547 |
| 6,544,028 | B2 * | 4/2003 | Wright | B29C 45/2725 425/572 |
| 6,572,361 | B2 * | 6/2003 | Gould | B29C 45/2806 425/572 |
| 7,320,590 | B2 * | 1/2008 | Fairy | B29C 45/2725 425/572 |
| 7,445,444 | B2 | 11/2008 | Guenther | |
| 8,241,032 | B2 * | 8/2012 | Klobucar | B29C 45/2725 425/572 |
| 9,446,543 | B2 | 9/2016 | Mühlemann | |
| 2003/0075563 | A1 * | 4/2003 | Bazzo | B29C 45/2701 239/134 |
| 2003/0118687 | A1 * | 6/2003 | Dewar | B29C 45/2806 425/564 |
| 2005/0226956 | A1 * | 10/2005 | Fischer | B29C 45/2738 425/549 |
| 2006/0024401 | A1 * | 2/2006 | Bazzo | B29C 45/30 425/568 |
| 2006/0054222 | A1 * | 3/2006 | Goinski | F16L 41/021 137/561 A |
| 2006/0083811 | A1 * | 4/2006 | Fairy | B29C 45/2725 425/568 |
| 2009/0136614 | A1 * | 5/2009 | Carlton | B29C 45/2701 425/567 |
| 2009/0191301 | A1 * | 7/2009 | Baumann | B29C 45/2725 425/549 |
| 2010/0104685 | A1 * | 4/2010 | Dufner | B29C 45/2756 425/570 |
| 2010/0233311 | A1 * | 9/2010 | Tapuchievici | B29C 45/27 425/563 |
| 2012/0118999 | A1 * | 5/2012 | Braun | B29C 45/2806 239/589 |
| 2015/0343686 | A1 * | 12/2015 | Mühlemann | B29C 45/2725 425/190 |
| 2017/0151701 | A1 * | 6/2017 | Lee | B29C 45/281 |
| 2018/0370104 | A1 * | 12/2018 | Günther | B29C 45/2725 |
| 2020/0114555 | A1 * | 4/2020 | Gaillard | B22F 7/08 |
| 2021/0268707 | A1 * | 9/2021 | Ward | B29C 45/77 |
| 2022/0152896 | A1 * | 5/2022 | Takehana | B29C 49/06 |
| 2023/0023482 | A1 * | 1/2023 | Ciccone | B29C 45/2725 |

FOREIGN PATENT DOCUMENTS

| | | |
|---|---|---|
| DE | 102007004066 A1 | 8/2007 |
| EP | 0523549 A2 | 1/1993 |
| EP | 0845345 A1 | 6/1998 |
| EP | 0590678 B1 | 1/1999 |
| EP | 2025491 A1 | 2/2009 |
| EP | 2925502 B1 | 1/2017 |

OTHER PUBLICATIONS

Search Report created Oct. 4, 2019 in related/corresponding DE Application No. 10 2019 106 975.0.

Written Opinion dated May 26, 2020 in related/corresponding International Application No. PCT/EP2020/055839.

* cited by examiner

HOT OR COLD RUNNER DEVICE FOR AN INJECTION MOLD COMPRISING AN EXCHANGEABLE DEFLECTION AND DISTRIBUTION INSERT

BACKGROUND AND SUMMARY OF THE INVENTION

Exemplary embodiments of the present invention relate to a hot or cold runner device for an injection mold, and to a method for forming the deflection and/or distribution insert and for mounting the deflection and/or distribution insert in a distributor block.

Hot or cold runner devices for an injection mold having an exchangeable deflection or distribution insert are known from the prior art. The deflection and/or distribution inserts are used to deflect or branch a melt flow by means of suitable inserts (deflection inserts, bushings, connecting arrangement) in a hot runner distributor block of a plastic injection mold in a melt channel, as described in EP 2 925 502 B1, in EP 2 025 491 A1 and in DE 196 49 621 B4.

It is a further object of such deflection and/or distribution inserts to plug a continuously straight drilled channel, as is also known from the prior art.

Many concepts and embodiments, e.g., according to EP 2 925 502 B1 and EP 2 025 491 A1, have in common that the deflection and/or distribution inserts have conical geometries or inclined surfaces and can be installed without gaps with correspondingly acting closing forces, but precise positioning without offset of the melt channel is very difficult or even impossible to achieve. This is due to the fact that the bores in the hot or cold runner distributors are usually deep-hole bores with L/D ratios of L/D>10, which always have a slight offset from the nominal position.

As a rule, the deflection and/or distribution inserts must be pressed into their mating geometry via the thermal stress forces when the hot runner components expand, so that a metallic sealing surface pressure is created between the deflection and/or distribution insert and a distribution block in which the deflection and/or distribution insert is inserted. The term distributor block is not to be understood too narrowly in the context of this application. In particular, it includes a design as a single-piece distributor plate or as a multi-piece distributor plate arrangement.

Simply inserted cylindrical deflection and/or distribution inserts (bushings)—e.g., according to EP 0 590 678 B1—can be manufactured and mounted more easily with precise positioning in relation to the melt channel, but they are not gap-free because of the necessary small clearance between the bushing and the bore, and therefore there is a risk of gas leakage (polymer degradation products) or even polymer leakage.

Cylindrical deflection and/or distribution inserts from the prior art, which are not only inserted, but are frictionally connected to the distributor block by means of shrink technology in order to build up the necessary surface pressure, are gap-free and thus leakage-free, but the problem of precise positioning with regard to the transitions of the melt channels is also present here.

In addition, the shrunken deflection and/or distribution inserts cannot be dismantled without causing damage. Although the dismantling of deflection and/or distribution inserts is a rare occurrence, it is necessary in practice, for example, in the event of incorrect heating of the distributor block with complete carbonization of the polymer. In order to be able to continue using the valuable distributor block, however, the melt channels must be completely cleaned. This can only be achieved if some to all of the deflection and/or distribution inserts are dismantled for this purpose in order to make the often very long melt channels of the distributor block accessible for mechanical cleaning tools.

Against this background, exemplary embodiments of the invention are directed to a deflecting and distribution insert for a hot or cold runner device of the generic type, which is exchangeable and still produces a reliable sealing effect after assembly.

According to embodiments there is a hot or cold runner device for an injection mold, which comprises a distributor block for polymer melts or polymer liquids, such as liquid silicone, wherein the distributor block comprises at least one central feed line, at least one melt channel, at least one fluid outlet, and at least one exchangeable deflection and/or distribution insert for deflecting and/or distributing the melts or liquids, at least one fluid outlet, and at least one exchangeable deflection and/or distribution insert for deflecting and/or distributing the melts or liquids, and wherein the deflection and/or distribution insert comprises a sleeve and a cone element, and wherein the deflection and/or distribution insert is free of gaps and misalignments or without offset at flow channel transitions by means of a pressing-in or pressing process and is held in a self-locking manner in the distributor block—even in the non-heated state.

This deflection and distribution insert is easy to assemble and also to disassemble and thus to replace. After assembly, it exhibits the tightness required for polymer processing in the gaps between the distributor block and the sleeve and between the sleeve and the cone element, i.e., in particular also at the transitions to the melt channels.

The outer cone of the cone element and preferably also a corresponding conical inner surface of the sleeve can each have a cone angle dimensioned in such a way that self-locking occurs between the inner cone of the sleeve and the outer cone of the cone element in the assembled or pressed-in state of the cone element. In this way, the cone element is held securely in the sleeve without offset in the unheated but also in the heated state.

The outer cone angle or cone angle of the cone element can in particular preferably be less than 8°, further preferably less than 5° and particularly preferably less than 2° and in each case again further preferably greater than 0.2°.

According to embodiments, there is a method for forming the deflection and/or distribution insert and for mounting the deflection and/or distribution insert in the distributor block of a hot or cold runner device for an injection mold, which comprises at least the following steps: the sleeve and the cone element are mounted without gaps and misalignments or without offset at flow channel transitions by means of a pressing-in process so that they are held in a self-locking manner in the distributor block or distributor block system.

The deflection and/or distribution insert is mounted without gaps or misalignments or without offset at flow channel transitions between corresponding melt channels and/or through channels and/or bores in the distributor block and/or in the sleeve and/or in the cone element and is held in the distributor block in a self-locking manner.

In particular, it can also be achieved that the deflection and/or distribution insert is designed and fixed in the distributor block in such a way that it can be dismantled non-destructively after overcoming the self-locking force, in particular can be dismantled easily by means of a pressing-out process.

In particular, elastic deformation of the sleeve, cone element, and distributor block after the pressing-in process can build up sufficient surface pressure in areas between the distributor insert bore and sleeve, and between the sleeve and cone element, to ensure tightness against the escape of polymer melts or polymer liquids under processing pressures.

It is also possible that dimensional matching after preassembly of the sleeve and cone element on the cylindrical outer diameter of the sleeve and on flange surfaces of the sleeve and cone element can achieve both a necessary surface pressure in all surfaces and an exact position of the flow channel transitions after pressing the sleeve and cone element into the distributor block.

A hot or cold runner nozzle for reaching a molding cavity can be connected to the deflection and/or distribution insert in the direction of flow. However, it is also conceivable that the deflection and/or distribution insert in the direction of flow is designed as a nozzle for directly reaching a molding cavity.

It may also be provided that additional sealing elements are installed at the flow channel transitions between the distribution insert bore and sleeve and between the sleeve and cone element, which, in addition to the high surface pressure in the surfaces of the elements after pressing in, provide additional protection against leakage, especially when very low-viscosity media flow through.

According to a further variant, it may be provided that at least one surface of the cone element is coated to prevent cold welding (galling) during preassembly, assembly or disassembly.

According to a further development, it may be advantageously provided that the sleeve is held in the distributor block by a press fit, wherein at least part of the force for the press fit is generated by the cone element. Due to the pressing force of the cone element into the sleeve, the outer diameter of the sleeve is enlarged or expanded, so that advantageously a press fit is created between the sleeve and the distributor block.

According to a further development of the method, it may be provided that a sufficient surface pressure is built up in surfaces between the distribution insert bore and sleeve and between the sleeve and the cone element by elastic deformation of the sleeve, cone element and distributor block after the pressing-in process, in order to ensure sealing against the escape of polymer melts or polymer liquids under processing pressures.

In particular, this ensures that the flow-optimized distribution and deflection inserts can be replaced without destruction, and that the channel transitions are largely or even completely without gaps and offsets. The distributor and deflection inserts can be dismantled and thus replaced without destruction, and a force-fit connection is obtained between the distributor block and the distribution and deflection insert without external clamping forces during operation (such as thermal stress) with sufficient surface pressure to keep the melt channel transitions sealed.

An even more detailed assembly process, which in this respect leads to particularly good results in the sense of the advantages described above, can for example have the following steps:

A) Providing the cone element including a specified melt channel section as a semi-finished part and the sleeve as a semi-finished part and providing the distributor block;

B) Insertion of a distribution insert bore and shoulders as stop surfaces and of one or more melt channel(s) into the distributor block;

C) Determining a height position and, optionally, a lateral offset of one or more melt channel(s) formed in the distributor block, with respect to at least one reference point;

D) Preassembly by plugging together the sleeve from A) and the cone element from A) and pressing these two parts outside the distributor block with a force $F_{VM}$ so that a defined elastic expansion of the outer diameter of the sleeve is produced;

E) Machining the oversize outer diameter of the sleeve to an oversize increased by the elastic expansion according to step D, relative to the dimension of the distribution insert bore, and machining an oversize stop surface of the cone element to the distance dimension between the stop surfaces of the distributor block, and introducing corresponding bores to channel sections for a melt flow in the cone element into the sleeve;

F) Sliding apart the preassembled unit consisting of the cone element and the sleeve;

G) Inserting the sleeve into the distribution insert bore and positioning it precisely, e.g., using a positioning aid;

H) Supporting the distributor block with the sleeve inserted, in particular on a flange; and I) Inserting the cone element into the sleeve and pressing the cone element into the sleeve so that an offset-free position of the transitions of the melt channel or melt channels between the distributor block and sleeve and between the sleeve and cone element is achieved and a surface pressure is generated in sealing surfaces between the distribution insert bore of the distributor block and the sleeve and the sleeve and the cone element.

For example, in a preferred design, the positioning aid may be a locking pin, or it may be a feather key, or it may simply be a corresponding contour that allows accurate positioning.

In this way, the advantages of the invention are advantageously implemented in the context of a method.

BRIEF DESCRIPTION OF THE DRAWING FIGURES

In the following, the invention is described in more detail by means of preferred exemplary embodiments with reference to the figures. The figures are to be understood as merely exemplary and do not illustrate the invention in a conclusive manner. Other literal embodiments and equivalents of the designs shown also fall within the scope of protection, wherein.

DETAILED DESCRIPTION

Figure 1A:
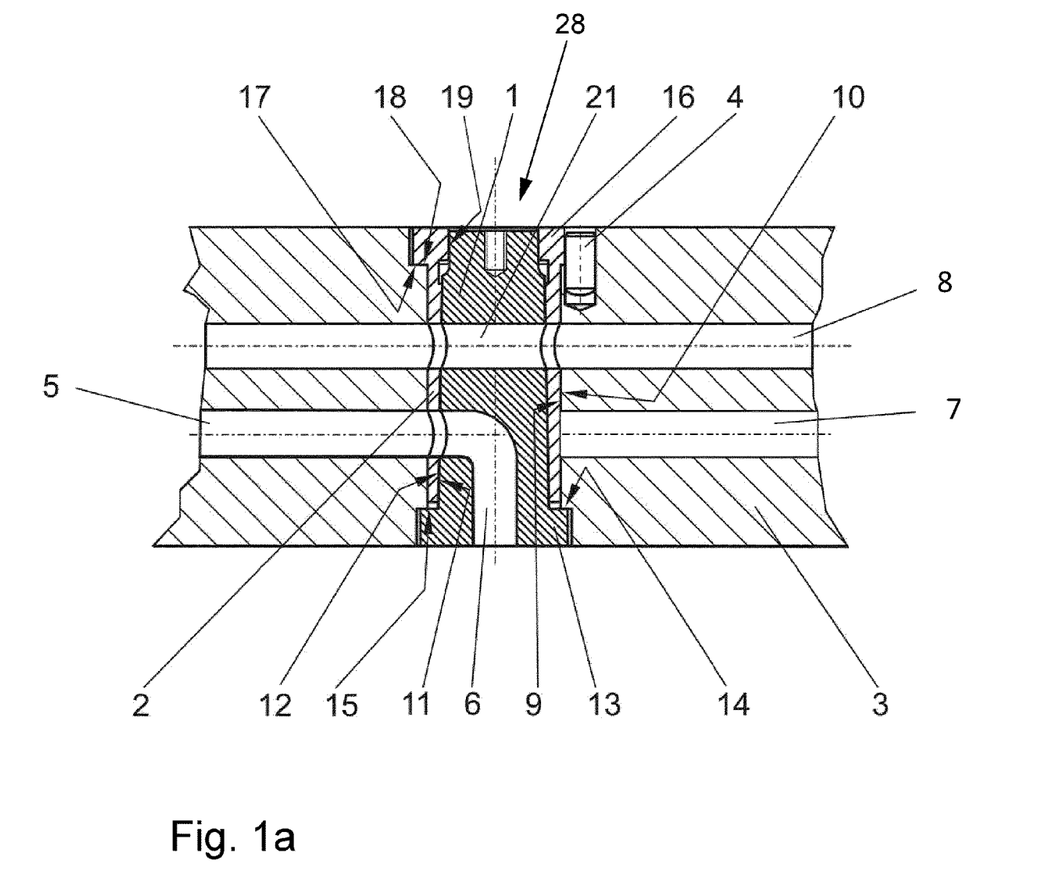
FIG. 1A shows a front view of a partial area of a hot or cold runner device for an injection mold having a distribution block of a distribution block system for polymer melts or polymer liquids, having an exemplary deflection and/or distribution insert according to the invention.
Figure 2:
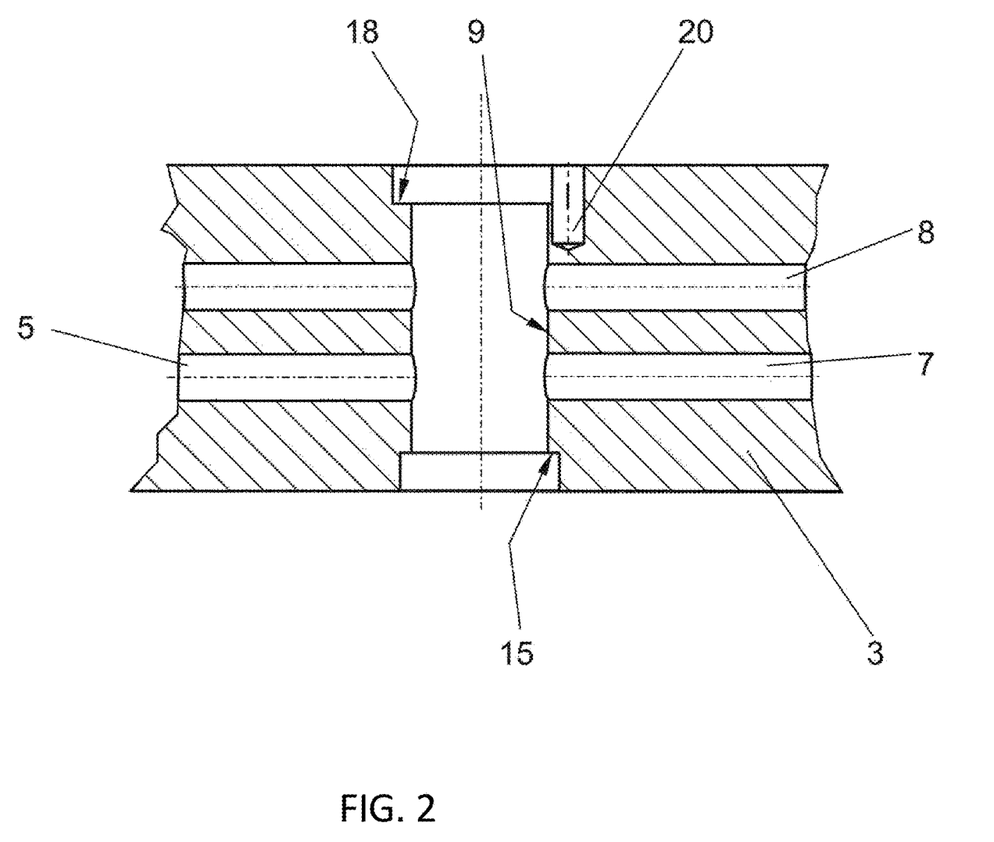
FIG. 2 shows the distributor block from FIG. 1, but without the mounted deflection and/or distribution insert.

FIG. 1A shows a hot or cold runner device for an injection mold otherwise shown here only in sections. This hot or cold runner device has a distributor block 3, which will also be referred to synonymously as "distributor" or "distributor plate" in the following. One or more melt channels 5, 7, and 8 are formed in the distributor block 3. In addition, the distributor block 3 has a distribution insert bore 9 for inserting the deflection or distribution insert 28 (see also FIG. 2). This is formed here in a stepped manner. As shown, the melt channel(s) 5, 7, and 8 can be formed at an angle to the distribution insert bore 9 and pass through it or open into it. In FIG. 1, the melt channels 5, 7, and 8 are formed at right angles to the distribution insert bore.

The distribution insert bore 9 is used to receive an exchangeable deflection or distribution insert 28, which can be inserted into it and which has a sleeve 2 and a cone element 1.

Figure 1B:
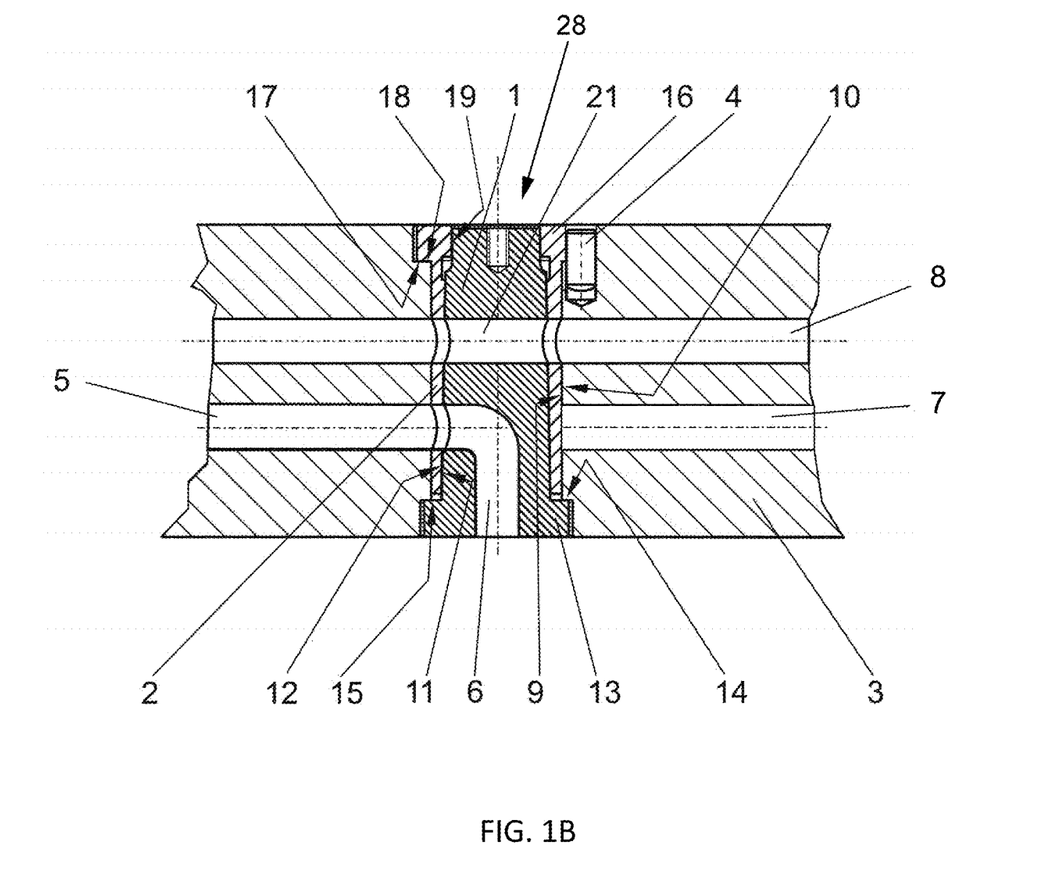
FIG. 1B shows a detail enlargement from FIG. 1A.

When plugging together, a polygonal projection 19 of the cone element 1 ensures a clear assignment to the prefabricated melt channels 6 and 21 (see FIG. 1B) of the cone element 1 in relation to a locking recess 22 (see FIG. 4) of the sleeve 2.

At least one hot or cold runner nozzle 23 can be attached to the arrangement consisting of the distributor block 3 and the deflection and/or distribution insert on one side. On the opposite side, on the other hand, a pressure piece 24 can be attached to this arrangement. In addition, the hot or cold runner nozzle 23 and the pressure piece 24 can each be attached to or inserted in further plates P1, P2 or the like of a higher-level injection mold.

The deflection and/or distribution insert 28 thus comprises at least the cone element 1 and the sleeve 2. It may further comprise a locking pin 4. There are also one or more corresponding bores and through channels to the melt channels 5, 7, and 8 or channel sections 6, 21 for a melt flow in the cone element 1, in the sleeve 2, and in the cone element 1. On the one hand, a kind of through channel for the melt channel 8 is implemented in the distributor block with the channel section 21 through the deflection and/or distribution insert in such a way as exemplified here, and on the other hand, a kind of deflection for melt from the channel section 5 (exemplified here from the left) through the deflection and/or distribution insert in the distributor block into the hot or cold channel nozzle 23, which serves to achieve a molding cavity, is implemented in such a way as exemplified here.

However, it is also conceivable that the deflection and/or distribution insert is designed as a nozzle in the direction of flow for directly reaching a molding cavity.

The sleeve 2 is initially mounted in the distributor block 3 without the cone element 1. For this purpose, it is inserted or pressed into the distributor block 3 by means of a clearance fit or transition fit when it is mounted in the distributor block 3. It may have been secured against rotation there. In particular, it can be additionally—preferably positively—secured against rotation by the locking pin 4.

By pressing the cone element 1 into the inserted sleeve 2, the deflection and/or distribution insert 28 is held in a self-locking manner without gaps and misalignments or without offsets at flow channel transitions 25 between corresponding melt channels/through channels/bores in the distributor block 3. In particular, the absence of gaps between the sleeve 2 and the distributor block 3 results from the elastic expansion or deformation of the sleeve 2 as a result of the pressing-in of the cone element 1 with its corresponding conical surfaces.

The sleeve 2 has an outer surface 10 and the distribution insert bore 9 of the distributor block 3 has an inner surface. The sleeve 2 further has an inner shell or inner surface 11 corresponding to a conical bore. Thereby, the outer surface of the cone element 1 forms a corresponding outer cone, at least in sections.

The outer cone of the cone element 1 (see, for example, FIGS. 3A, 3B) with an outer surface 12 and the corresponding conical inner surface of the sleeve 2 each have a cone angle dimensioned in such a way that self-locking occurs between the inner cone of the sleeve 2 and the outer cone of the cone element 1 in the assembled or pressed-in state of the cone element 1. In this way, the cone element 1 is held securely without offset in the sleeve 2 in the unheated but also in the heated state.

The outer cone angle or cone angle of the cone element 1 (relative to its central perpendicular, see dotted line in FIG. 1) may for this purpose within the scope of the exemplary embodiments—but also of the claims—preferably be less than 8°, further preferably less than 5° and particularly preferably less than 2°, and in each case again further preferably greater than 0.2°.

Figures 3A, 3B, 3C:
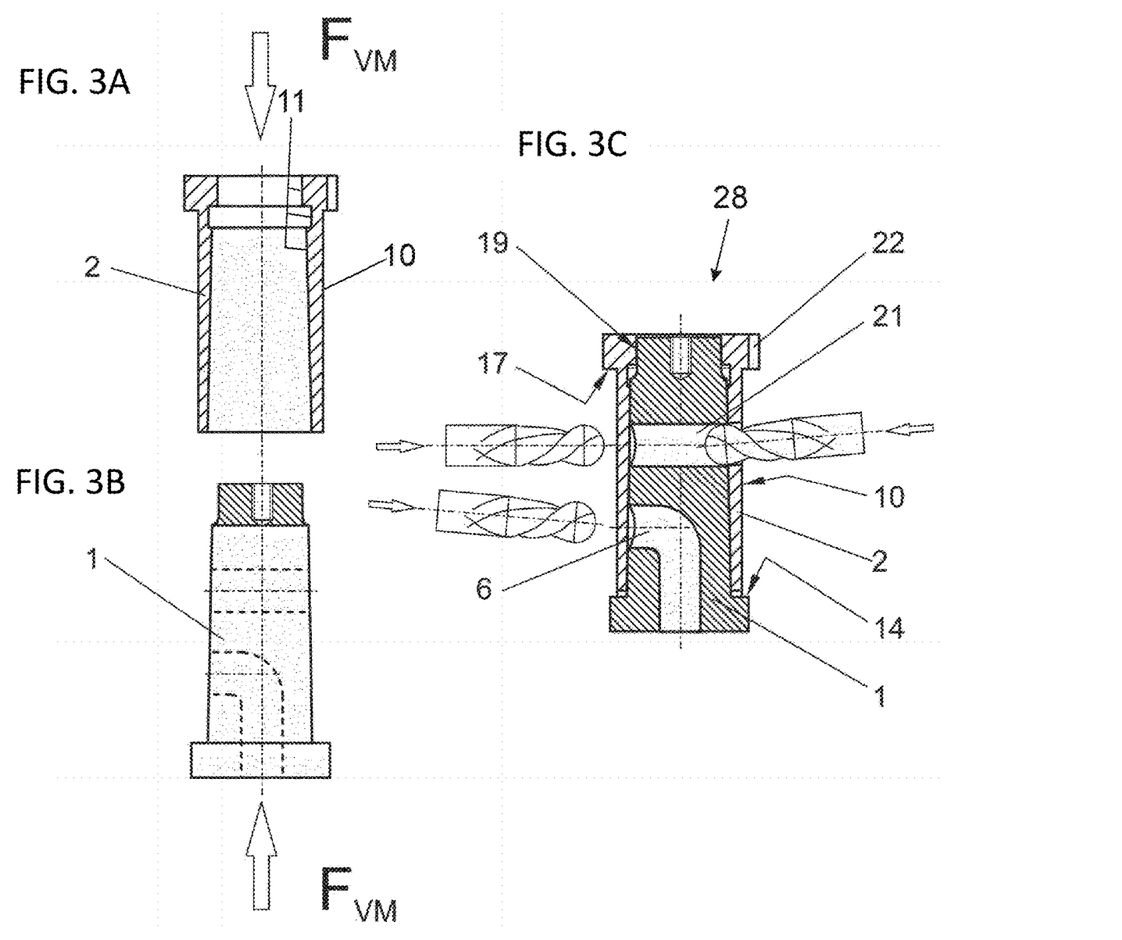
FIG. 3A shows a sleeve of the deflection and/or distribution insert from FIG. 1.
FIG. 3B shows a cone element of the deflection and/or distribution insert from FIG. 1A.
FIG. 3C shows the sleeve from FIG. 3A with the assembled cone element from FIG. 3B during a mechanical machining process.

In addition, the outer diameter of the sleeve 2 (outer surface 10) in the preassembled state according to FIG. 3C is dimensioned so that in the assembled state (cone element 1 pressed in) in the distributor block 3 in the corresponding cylindrical surfaces 9 and 10 of the distribution insert bore and the sleeve 2, such a high surface pressure is produced that on the one hand this produces the tightness (freedom from gaps) and on the other hand fixes the deflection and/or distribution insert 28 in the distributor block 3. Such a comparable high surface pressure on cylindrical fitting surfaces can only be achieved by a shrink fit that cannot be dismantled without causing damage, but not by a press fit.

The principle of self-locking holds the cone element 1 and the sleeve 2 of the deflection or distribution insert 28 in position in the distributor block 3. Thereby, by appropriate dimensioning of these components and by means of an appropriate pressing-in process, clamping and spreading forces can be generated in the sealing surfaces 9,10 (between the inner circumference of the distribution insert bore 9 and the outer surface 10 of the sleeve 2 as well as between the inner circumference of the sleeve 2 and the outer circumference of the cone element 1, which in turn generate a surface pressure in the joints in such a way that a tightness in operation against polymer melts or polymer liquids is given.

Thus, the deflection and/or distribution insert 28 can be disassembled without destruction and thus exchanged and can be held in operation without external clamping forces (such as by thermal bracing) in order to obtain a force-fit connection between the distributor block and the element arrangement with sufficient surface pressure for tight sealing in the area of the melt channel transitions.

The described features and properties are achievable, for example, by the following method:

In a first step A), the cone element 1 is provided as a semi-finished part, the sleeve 2 as a semi-finished part, and the distributor block 3 and preferably also the locking pin 4 are also provided.

In a second step B), a distribution insert bore 9 and shoulders with stop surfaces 15 and 18 are introduced into the distributor block 3. In addition, a pin bore 20 can be formed in the distributor block, see FIG. 2. One or more melt channels can also be formed in the distributor block 3 now or in advance, e.g., by a deep-hole drilling process.

In a third step C), a height position and, if necessary, a lateral offset of the melt channels 5 and 8 present in the distributor block are determined in relation to the stop surface 18 or to the position of the locking pin 4. In addition, a distance between the two stop surfaces 15 and 18 of the shoulders and the actual diameter dimensions of the melt channels 5 and 8 are preferably determined, as is the actual diameter of the distribution insert bore 9.

In a fourth step D)—see FIGS. 3A-3C—the semi-finished part of the sleeve 2—i.e., the sleeve 2 without melt channel bores and allowance on the cylindrical outer surface 10—and the semi-finished part of the cone element 1—i.e., the cone element 1 with allowance on the stop surface 14—are plugged together in a preassembly step and pressed outside the distributor block 3 with a controlled force $F_{VM}$ so that a defined elastic expansion of the outer diameter of the sleeve 2 is produced.

When plugging together, a polygonal projection 19 of the cone element 1 ensures a clear assignment to the prefabricated melt channels 6 and 21 of the cone element 1 in relation to a locking recess 22 of the sleeve 2.

Within the scope of the elastic deformability of the sleeve 2, the value of the expansion is selected in such a way that during subsequent assembly (pressing-in process) of the combination sleeve 2-cone element 1 in the distribution insert bore 9 of the distributor block 3, sufficient surface pressure is produced—preferably in the order of 200 to 300 N/mm$^2$.

In a fifth step E), an outer diameter 10, provided with an allowance, of the sleeve 2 pressed with the cone element 1, is machined to the dimension corresponding to the precisely measured diameter of the distribution insert bore 9 according to the second step B, plus the allowance corresponding to the defined expansion according to step D. Furthermore, the stop surface 14 provided with an allowance on the flange 13 of the cone element 1 is machined to the precisely measured distance dimension between the stop surfaces 15 and 18 of the distributor block 3, corresponding to the measurement according to the third step C.

The stop surface/flange surface 17 of the sleeve 2 can form the reference surface, see FIG. 3C. After this machining, the dimension between the stop surfaces 14 of the cone element 1 and the stop surface 17 of the sleeve 2 corresponds to the measured distance dimension between the surfaces 15 and 18 of the distributor block 3. The stop surface 14 limits the insertion depth of the cone element 1 into the distributor block 3.

Furthermore, by means of a tool, for example with a ball cutter—via correspondingly calculated angular positions according to the measurement results from the third step C (connecting penetration points on the lateral surfaces between 9 and 12) corresponding bores to the channel sections 6, 21 for a melt flow in the cone element 1 are introduced into the sleeve 2.

In addition to the stop surface 17 of the sleeve 2, the recess 22 on the sleeve 2 for the locking pin 4 is also the dimensional reference for the bore correction. The stop surface 17 limits the insertion depth of the sleeve 2 in the distributor block 3. In this respect, the sleeve 2 with the recess 22 in interaction with the locking pin 4 and the pin bore 20 has a positioning device by which the position of the sleeve 2 in the distributor block 3 is predetermined.

The possible offset of the melt channels 5, 7, 8 of the distributor block 3 in the range of tenths of a millimeter with respect to the channel sections 6 and 21 in the cone element 1 due to the deep-hole drilling process requires only very shallow correction angles, and using a ball cutter results in only minimal out-of-roundness in the melt channel sections 6 and 21 of the cone element as well as the sleeve 2. However, this allows advantageous freedom from offset and equally advantageous stagnation-free channel guidance.

In a sixth step F), after correction of the cone element 1 and the sleeve 2 into which the cone element 1 is pressed, the sleeve 2 and the cone element 1 are pushed apart again. This requires a smaller force $F_{VL} < F_{VM}$, wherein the amount of $F_{VL}$ depends on the taper angle and the coefficient of friction between the tapered outer surface of the cone element 1 and the tapered bore of the sleeve 2. After the sleeve 2 is pushed apart, the outer diameter 10 of the sleeve 2 practically assumes the dimension of the distribution insert bore 9, since the corrective measure after the fifth step E takes into account the elastic expansion after the fourth step D as an allowance.

Figure 4:
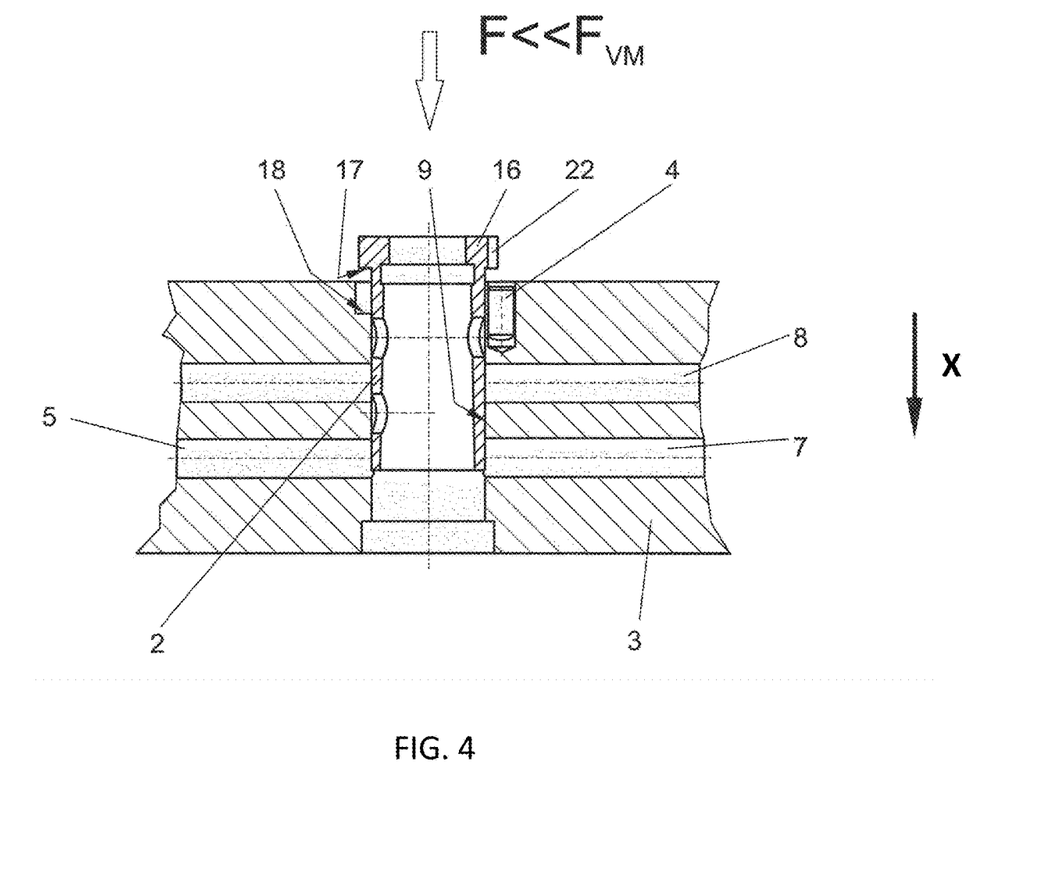
FIG. 4 shows the machined sleeve from FIG. 3C during an assembly or joining process in the distributor block.
Figure 5:
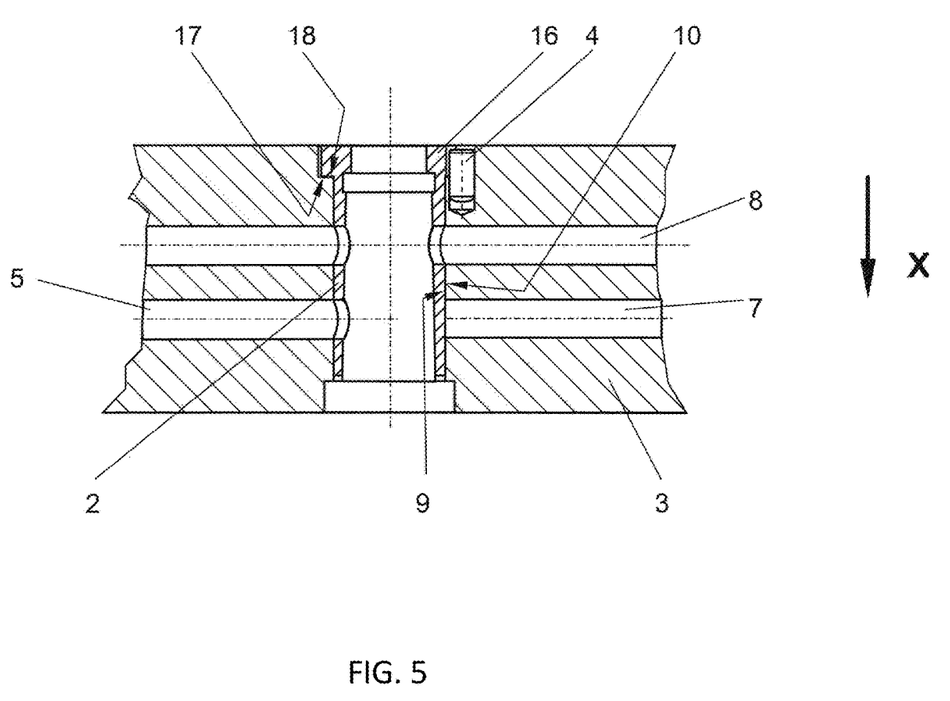
FIG. 5 shows the arrangement shown in FIG. 4 after the assembly or joining process has been completed.

In a seventh step G), the sleeve 2 can thus be pushed with a force F, wherein F is lower than $F_{VM}$, into the distribution insert bore 9 of the distributor block 3 in the direction X according to FIG. 4 (clearance fit) and positioned with directional accuracy by means of the previously mounted locking pin 4 and the corresponding recess 22 on the flange 16 of the sleeve 2 until the stop surfaces 17 and 18 of the sleeve 2 and the distributor block 3 are in contact, as shown in FIG. 5.

Figure 6:
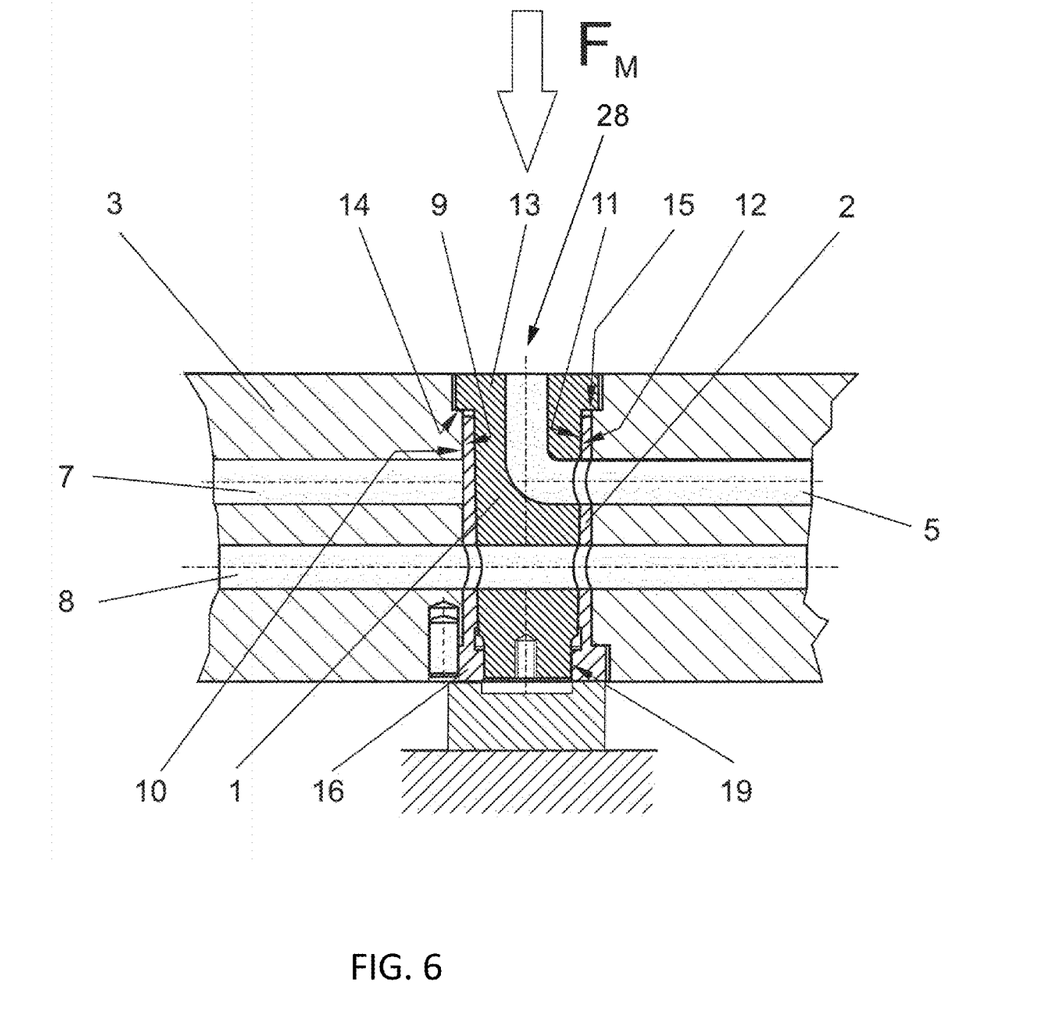
FIG. 6 shows the cone element from FIG. 3B or FIG. 3C during a joining process in the preassembled sleeve of the arrangement from FIG. 5.

In an eighth step H), corresponding to FIG. 6, the distributor block 3 with the inserted sleeve 2 and the mounted locking pin 4 is supported on a flange 16.

Then, in a ninth step I), the cone element 1 is inserted into the sleeve 2 so that the melt channel sections 5 and 6 can each form a continuous and offset-free flow channel through the sleeve 2 and the cone element 1 via the polygon geometry 19, which corresponds positively with a polynomial geometry of the sleeve 2. Then, in step I), the cone element 1 is still pressed into the sleeve 2 with the assembly force $F_M$ until the stop surfaces 14 and 15 touch. The prior dimensional matching of the distance between the flanges 13 and 16 or the stop surfaces 14 and 17 and the stop surfaces 15 and 18 after the fifth step E ensures the correct, offset-free position of the transitions of the melt channels 5 and 8 between distributor block 3 and sleeve 2 and between sleeve 2 and cone element 1.

Because of the oversize diameter of the outer surface 10 of the sleeve 2 produced in the preassembled state, the pressing process thereby generates the necessary surface pressure in the sealing surfaces 9 and 10 as well as 11 and 12, preferably in the order of 200-300 N/mm$^2$, as required for polymer processing to achieve a metallic sealing effect.

The described assembly technique also offers the possibility of incorporating additional sealing elements, such as rubber-based sealing rings, which are useful when processing very low-viscosity polymers, for example.

Figures 7A, 7C:
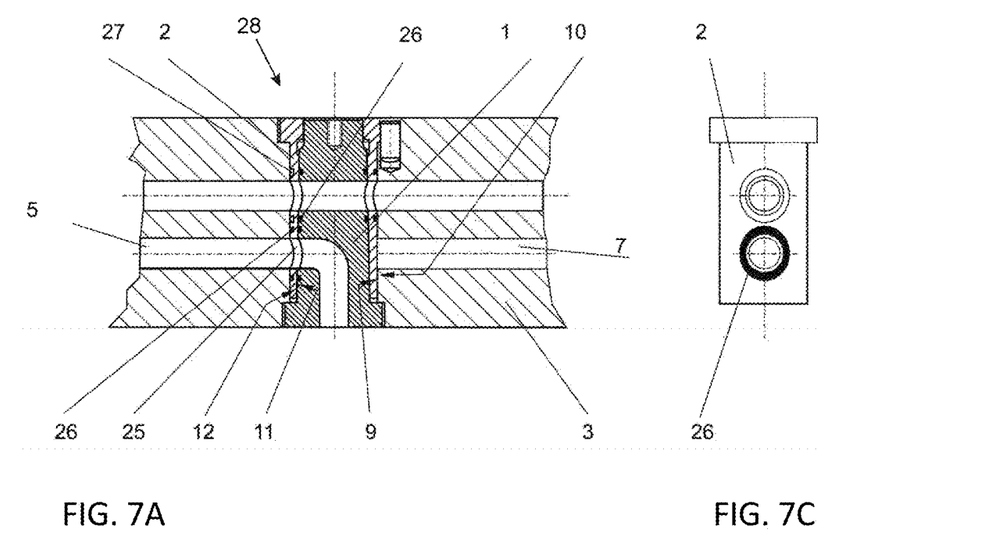
FIG. 7A shows the assembled deflection and/or distribution insert having a first embodiment of a seal to the distributor.
FIG. 7C shows a side view of the assembled deflection and/or distribution insert from FIG. 7A.

This can be carried out according to FIG. 7A by inserting sealing elements 26 into recesses 27 of the sleeve 2 before inserting the sleeve 2 into the distributor block 3, and then inserting sealing elements 26 into provided recesses of the cone element 1 as well before pressing the cone element 1 into the sleeve 2.

Figures 7B, 7D:
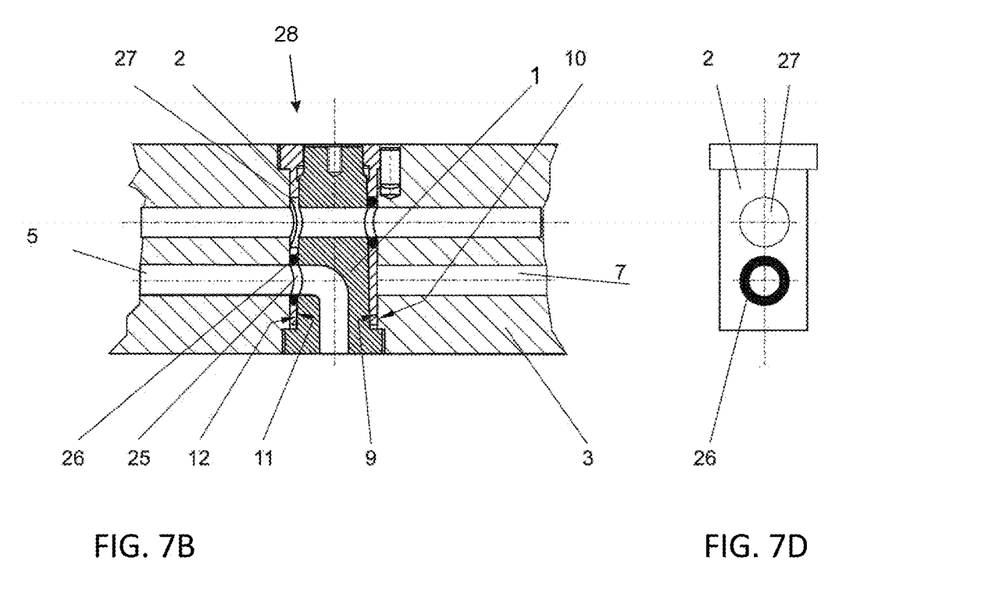
FIG. 7B shows the assembled deflection and/or distribution insert having a further embodiment of a seal to the distributor.
FIG. 7D shows a side view of the deflection and/or distribution insert from FIG. 7B.

According to FIG. 7B, the assembly of a sealing element 26—such as a sealing ring—can be carried out after the sleeve 2 has been pushed into the distributor block 3. This advantageously reduces the risk of damage to the sealing elements 26, since they do not have to be pushed over sharp edges.

After the sealing elements 26 have been inserted into the recesses 27 of the inserted sleeve 2, the cone element 1 is pressed in. The conical surface of the cone element gently deforms the sealing elements and a uniform sealing effect is achieved over the entire circumference of the sealing elements.

It is achieved in such a way that the deflection and/or distribution insert is mounted without gaps and misalignment or without offset at flow channel transitions 25 by means of a pressing-in process and is held in a self-locking manner in the distributor block 3.

A wide variety of principles can be used for disassembly. For example, according to one variant, an expulsion surface can be arranged on the cone element 1, which can be reached via a clearance in the distributor block 3 and the sleeve 2 with an expulsion wedge. Alternatively, in the case of a sleeve 2 and a cone element 1 that can be reached from both sides in the distributor block 3, a press can be used and the cone element 1 and possibly the sleeve 2 can be pressed out against the mounting direction. A further alternative could be to provide a threaded hole or threaded pin on the cone element 1, into which a device is screwed or screwed on, with which the cone element 1 can then be pulled out.

The exemplary embodiment described here shows an assembly of the sleeve 2 and the cone element 1 from opposite assembly directions. However, it is also possible to mount the sleeve 2 and the cone element 1 with the same mounting direction, so that the device could also be used in a blind hole, for example. The cone element 1 and the sleeve 2 can thus be removed from the opening in the distributor block 3 one after the other and in the same direction.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS

1 Cone element
2 Sleeve
3 Distributor, distributor block
4 Locking pin
5 Melt channel
6 Melt channel
7 Melt channel
8 Melt channel
9 Distribution insert bore
10 Exterior surface
11 Inner surface
12 Outer surface
13 Flange
14 Stop surface
15 Stop surface
16 Flange
17 Stop surface
18 Stop surface
19 Polygon
20 Pin bore
21 Melt channel
22 Recess
23 Hot runner nozzle/Cold runner nozzle
24 Pressure piece
25 Flow channel transition
26 Sealing element
27 Recess
28 Deflection and/or distribution insert
P1, P2 Plates

The invention claimed is:

1. A hot or cold runner device for an injection mold, comprising:
a distributor block for polymer melts or polymer liquids, wherein the distributor block has at least one central feed line, at least one melt channel, at least one fluid outlet; and
at least one exchangeable deflection and/or distribution insert,
wherein the deflection and/or distribution insert has a sleeve and a cone element for deflecting and/or distributing the melts or liquids, and the deflection and/or distribution insert is mounted without gaps and misalignments or without offset at flow channel transitions by a pressing-in process, and
wherein the cone element has an outer cone, an inner surface of the sleeve is conical, and outer cone of the cone element and the conical inner surface of the sleeve have a cone angle dimensioned in such a way that the outer cone of the cone element and the conical inner surface of the sleeve are held against each other in a self-locking manner.

2. The hot or cold runner device of claim 1, wherein the deflection and/or distribution insert is configured and fixed in the distributor block in such a way that the deflection and/or distribution insert can be disassembled without destruction after overcoming a self-locking force of the self-locking occurring between the outer cone of the cone element and the conical inner surface of the sleeve.

3. The hot or cold runner device of claim 2, wherein the deflection and/or distribution insert is disassemblable without destruction by a pressing-out process.

4. The hot or cold runner device of claim 1, wherein, as a result of elastic deformation of the sleeve, the cone element, and the distributor block after the pressing-in process, sufficient surface pressure is built up in surfaces between a distribution insert bore and the sleeve and between the sleeve and the cone element to ensure sealing against escape of polymer melts or polymer liquids under processing pressures.

5. The hot or cold runner device of claim 1, wherein the sleeve is elastically deformed in a preassembled state with the cone element, and an outer surface of the sleeve is machinable to a required cross-section.

6. The hot or cold runner device of claim 5, wherein the machined cross-section of the outer surface of the sleeve is smaller in a disassembled state of the sleeve than in a preassembled state.

7. The hot or cold runner device of claim 1, wherein the sleeve has a stop surface limiting an insertion depth of the cone element into the distributor block.

8. The hot or cold runner device of claim 1, wherein the cone element has a stop surface limiting an insertion depth of the cone element into the distributor block or into the sleeve.

9. The hot or cold runner device of claim 1, wherein a position of the sleeve inserted in the distributor block is predetermined by a positioning device.

10. The hot or cold runner device of claim 1, wherein the deflection and/or distribution insert is a nozzle in a flow direction for directly reaching a molding cavity.

11. The hot or cold runner device of claim 10, wherein the deflection and/or distribution insert is sealingly applied in the flow direction to a hot runner nozzle or to a cold runner nozzle for reaching the molding cavity.

12. The hot or cold runner device of claim 1, wherein
sealing elements are installed at the flow channel transitions between an insert bore and the sleeve and between the sleeve and the cone element, which, in addition to high surface pressure in surfaces of the sealing elements after pressing in, is an additional safeguard against leakage.

13. The hot or cold runner device of claim 1, wherein at least one surface of the sleeve is coated to prevent cold welding during preassembly,
assembly, or disassembly.

14. The hot or cold runner device of claim 1, wherein at least one surface of the cone element is coated to prevent cold welding during preassembly, assembly, or disassembly.

15. The hot or cold runner device of claim 1, wherein the sleeve is held in the distributor block by a press fit, wherein at least part of force for the press fit is generated by the cone element.

16. A method for forming and mounting a deflection and/or distribution insert in a distributor block of a hot or cold runner device for an injection mold, the method comprising:
   providing at least one exchangeable deflection and/or distribution insert, wherein
   the deflection and/or distribution insert has a sleeve and a cone element for deflecting and/or distributing the melts or liquids, and wherein the cone element has an outer cone, an inner surface of the sleeve is conical;
   providing a distributor block for polymer melts or polymer liquids, wherein the distributor block has at least one central feed line, at least one melt channel, at least one fluid outlet; and
   mounting the sleeve and the cone element without gap and misalignment or without offset at flow channel transitions by a pressing-in process so that the sleeve and cone element are held in a self-locking manner in the distributor block, wherein each of the outer cone of the cone element and the conical inner surface of the sleeve have a cone angle dimensioned in such a way that the holding in the self-locking manner occurs.

17. The method of claim 16, wherein, as a result of elastic deformation of the sleeve, the cone element, and the distributor block after the pressing-in process, sufficient surface pressure is built up in surfaces between a distribution insert bore and the sleeve and between the sleeve and the cone element to ensure tightness against the escape of polymer melts or polymer liquids under processing pressures.

18. The method of claim 16, further comprising:
   A) providing the cone element including a specified melt channel section as a semi-finished part and the sleeve as a semi-finished part;
   B) inserting a distribution insert bore and shoulders as stop surfaces and the at least one melt channel into the distributor block;
   C) determining a height position and, a lateral offset of one or more melt channel(s) formed in the distributor block, with respect to at least one reference point;
   D) preassembling the unit by plugging together the sleeve from A) and the cone element from A) and pressing these two parts outside the distributor block with a force so that a defined elastic expansion of the outer diameter of the sleeve is produced;
   E) machining the oversize outer diameter of the sleeve to an oversize increased by the elastic expansion according to step D), relative to a dimension of the distribution insert bore, and machining an oversize stop surface of the cone element to a distance dimension between the stop surfaces of the distributor block, and introducing corresponding bores to channel sections for a melt flow in the cone element into the sleeve;
   F) pushing apart the preassembled unit consisting of the cone element and the sleeve;
   G) inserting the sleeve into the distribution insert bore and positioning the inserted sleeve using a positioning aid;
   H) supporting the distributor block with the inserted sleeve on a flange; and
   I) inserting the cone element into the sleeve and pressing in the cone element into the sleeve, so that an offset-free position of the transitions of the at least one melt channel between distributor block and sleeve and between sleeve and cone element is achieved and a surface pressure is generated in sealing surfaces between the distribution insert bore of the distributor block and the sleeve and the sleeve and the cone element.

* * * * *